N. B. TEMPLER.
TROLLEY GUARD.
APPLICATION FILED DEC. 24, 1917.

1,360,817.

Patented Nov. 30, 1920.
2 SHEETS—SHEET 1.

Inventor
Norman Beavis Templer.
By his Attorney
Wm Wallace White

N. B. TEMPLER.
TROLLEY GUARD.
APPLICATION FILED DEC. 24, 1917.
1,360,817.
Patented Nov. 30, 1920.
2 SHEETS—SHEET 2.
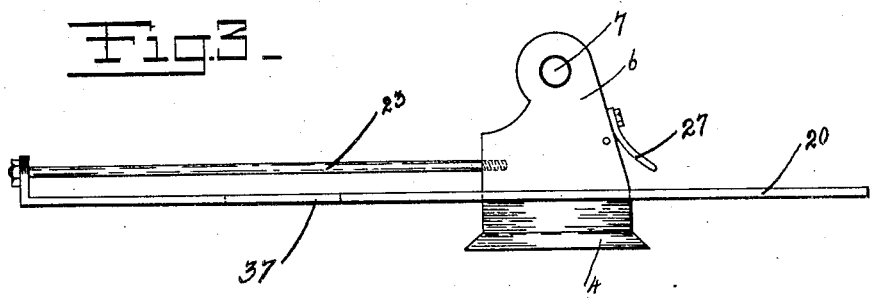
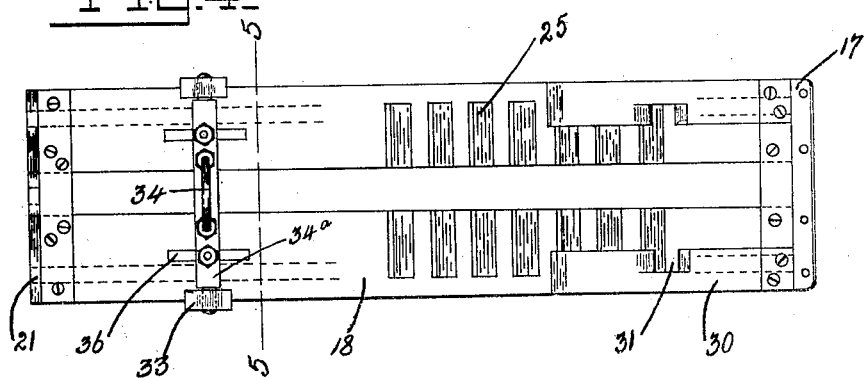
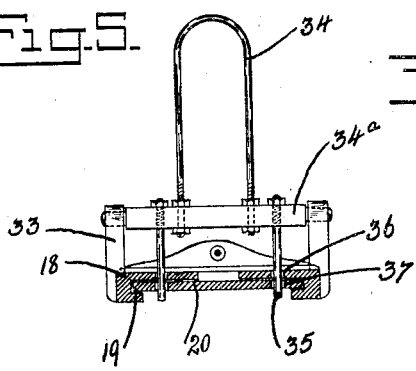
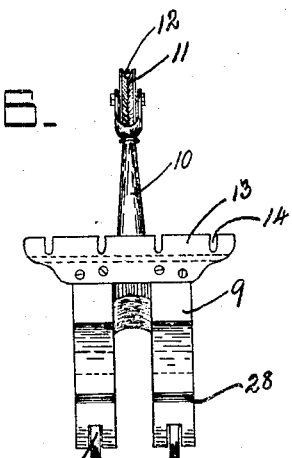
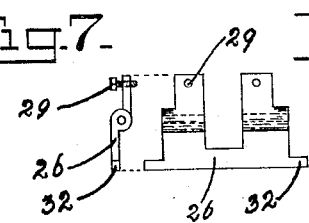
Inventor
*Norman Beavis Templer.*
By his Attorney
*Wm Wallace White*

UNITED STATES PATENT OFFICE.

NORMAN BEAVIS TEMPLER, OF MALVERN, SOUTH AUSTRALIA, AUSTRALIA.

TROLLEY-GUARD.

1,360,817.  Specification of Letters Patent.  Patented Nov. 30, 1920.

Application filed December 24, 1917. Serial No. 208,555.

*To all whom it may concern:*

Be it known that I, NORMAN BEAVIS TEMPLER, a subject of the King of England, residing at 237 Unley road, Malvern, South Australia, Australia, have invented new and useful Improvements in Trolley-Guards, of which the following is a specification.

This invention relates to trolley guards.

The principal object of the invention is to provide a guard which will prevent a trolley pole, when the trolley wheel has been displaced from the trolley wire, from being thrown upward by its spring with such force as to strike the trolley wire or its supporting means, so that breakage thereof is avoided. Specifically, the object of the invention is to provide means for limiting the upward movement of a trolley pole when its trolley wheel has been accidentally displaced.

The invention consists of the construction, combination and arrangement of parts, as herein illustrated, described and claimed.

In the acompanying drawings, forming part hereof, is illustrated a form of embodiment of the invention, in which drawings similar reference characters designate corresponding parts, and in which:

Fig. 3 is a side elevation showing the standard for supporting the trolley pole with its immediately connected parts detached from the remainder of the construction;

Fig. 4 is a plan view of the plate movable with relation to the trolley supporting standard;

Fig. 5 is a transverse section taken approximately on the line 5—5 of Fig. 4;

Fig. 6 is a rear elevation of the socket and its connected trolley pole and parts;

Fig. 7 is an edge elevation of the pawl used in the construction; and

Fig. 8 is an elevation of the pawl.

Figure 1:
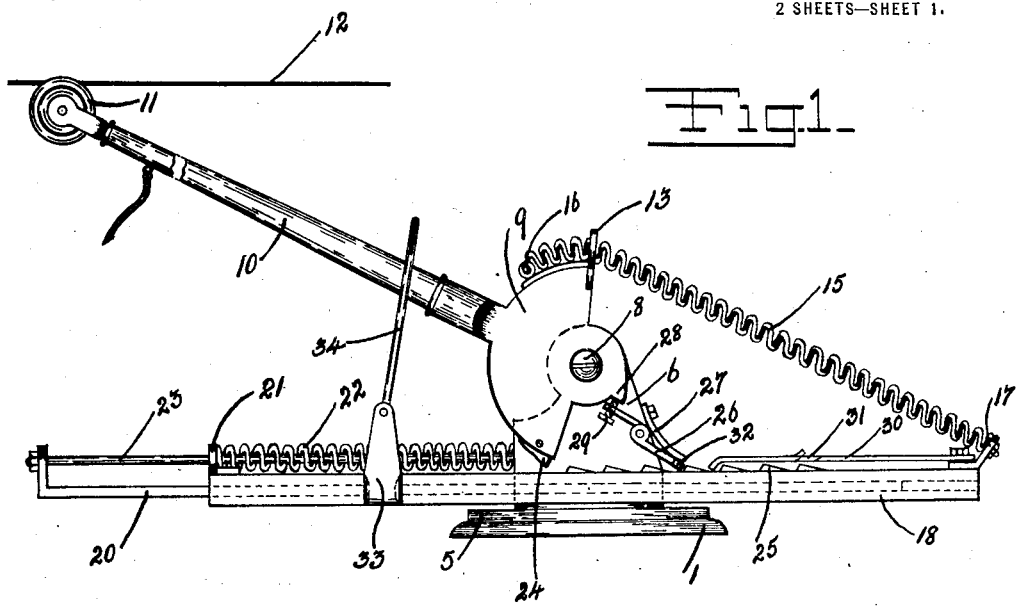
Figure 1 is a side elevation, showing the parts in normal position.

Referring to the drawings, 1 designates a base piece, having provided in its upper surface a raceway adapted to receive the usual anti-friction balls 3.

A flange plate 4 is disposed on the base piece 1 and is held in position by an annular member 5, permitting the easy rotation of the plate 4. A vertical standard 6 is secured on or forms a part of the flange plate 4 and is provided in its upper end with an opening 7, adapted to receive a pin 8, which, forms the pivot of a bifurcated socket 9 carrying the usual trolley pole 10.

The trolley pole 10 is provided with the usual wheel 11 adapted to contact with the ordinary form of overhead trolley wire 12.

Secured to the rear side of the socket 9 is a bridge piece 13, provided with slots 14, (better shown in Fig. 6), through which slots are disposed a plurality of springs 15, secured to the socket 9 at the point 16 and having their opposite ends secured to an angle iron 17, which angle iron is carried adjacent the end of a plate 18 which is movably retained with relation to the standard 6.

The plate 18 is provided with interior channels 19 arranged to receive the opposite edges of a plate 20 which is secured to the standard 6. The plate 18 is provided with an up-turned end 21 against which abuts one end of a spring 22, the opposite end abutting against the standard 6 and being retained in position by means of an ordinary form of guide rod 23.

Carried by one side of the socket 9, adjacent its lower edge is a plurality of pivoted dogs 24 arranged to engage the teeth of a rack 25, which rack is carried by the plate 18. A pawl 26 is pivoted to the standard 6 and one end is normally maintained depressed by means of a spring 27, also secured on the standard. The socket 9 is provided with a lug 28 adapted to contact one end of the pawl 26 and to rock the same after the trolley pole 10 is moved by being pulled down by means of the usual rope and returned by its springs 15, or when the trolley pole is accidentally displaced. A set screw 29 carried by the pawl 26 is arranged to vary the throw of the pawl.

A flat spring 30 is disposed on the plate 18 and is held in position by means of the fastening members for the angle iron 17. The spring 30 is provided with a recess 31 on each side through which may pass the lugs 32 on each side of the pawl 26, so that upon movement in one direction the lugs 32 ride over the spring 30 and pass through the recesses, so that on the return movement the lugs 32 pass underneath the spring 30.

Bearings 33 are provided on the plate 18 and are adapted to pivotally support a yoke 34, which is adjustably held on a cross bar 34ª and passes over the trolley pole 10. The yoke 34 is provided with downwardly projecting ends 35, which extend through slot 36 formed in the plate 18 and through slot 37 formed in the plate 20. Movement of the plates with relation to each other causes a rocking movement of the yoke 34 as best shown in Fig. 2.

Figure 2:
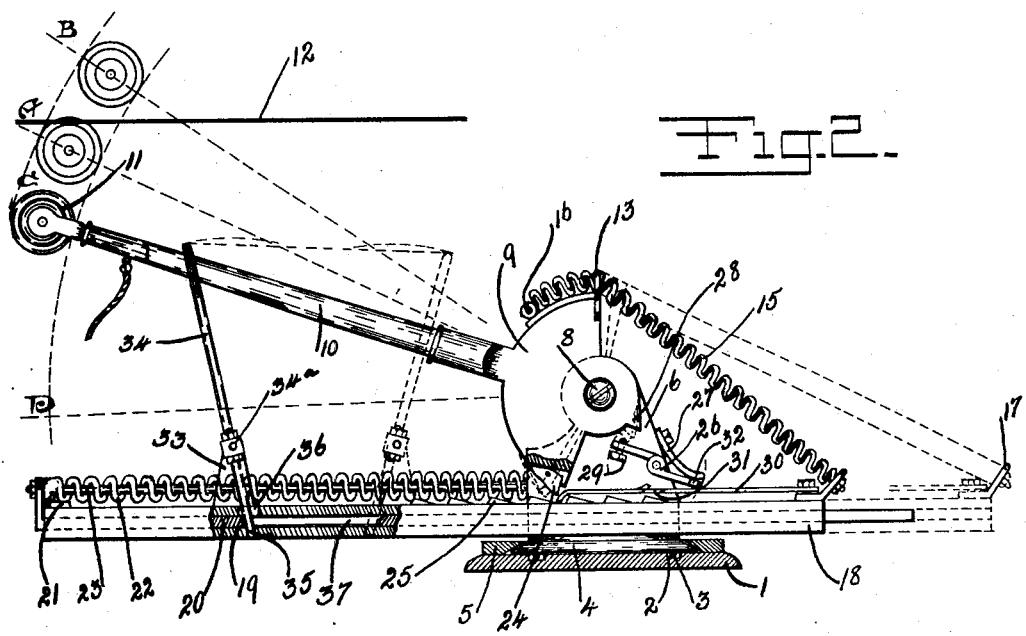
Fig. 2 is a side elevation, partly in section, showing the parts in full line where the trolley pole is being held below the wire so as not to contact therewith, the dotted lines indicating respectively the positions of the trolley pole normal and extended above the trolley wire.

In the operation of the device the pole 10 is moved up and down a number of times, so that the dogs 24 engage successively the teeth in the rack 25 and actuate the plate 18 toward the right hand as shown in Figs. 1 and 2. The trolley wheel is then set on the wire 12, in which position it is held by the tension of the springs 15. The movement of the plate 18 toward the righthand produces a tension on the spring 22. Also this movement of the plate 18 rocks the yoke 34 to the dotted line position shown in Fig. 2, permitting the upper end of the pole 10 to extend nearly to the wire 12.

Accidental displacement of the wheel 11 from the wire 12, permits the movement of the pole to the dotted line position shown in Fig. 2, that is to say with the wheel 11 above the wire 12. This movement of the pole 10 rocks the socket 9 so that the lugs 28 contact with the set screw 29 of the pawl 26, raising it against the tension of the spring 27 and clearing the rack teeth 25. Under the tension of the spring 22, the plate 18 is forced toward the lefthand, the end of the slot 38 in the plate 20 contacting with the projecting ends 35 of the yoke 34 and rocking it to the full line position shown in Fig. 2, thereby retaining the upper end of the pole 10 below the level of the wire 12 and preventing damage to the wire and its supporting means.

The apparatus may then be reset by simply moving the trolley pole 10 up and down so that the dogs 24 successively engage the rack teeth 25 and the plate 18 being held against the tension of the spring 22 by means of pawl 26.

Having thus described my invention, what I claim as new and desire to secure by Letters Patent is:

1. A trolley guard comprising the combination of a pivotally supported pole, a plate fixed with relation to the pole, a plate movable with relation to the pole, a yoke carried by one of the plates and coöperating with the other plate and extending over the pole, means for moving one of the plates to lock the yoke when the pole is raised beyond a predetermined point.

2. A trolley guard comprising the combination of a standard, a plate carried by the standard and fixed in relation thereto, a second plate slidably carried by the first plate, rack teeth disposed on the second plate, a pawl carried by the standard and arranged to engage the rack teeth, a trolley pivoted to the standard and provided with lugs arranged to engage the pawl and to release the same from the rack teeth when the trolley pole is in one position, pivoted dogs carried by the trolley pole and arranged to engage the rack teeth when the trolley pole is rocked on its standard, means for moving the plates with relation to each other when the trolley pole is rocked beyond a predetermined point, and means carried by one of the plates for engaging the trolley pole and for holding the same below a predetermined point when the plates are moved with relation to each other.

3. In a trolley guard, the combination comprising a standard, a bifurcated socket pivoted to the standard, a bridge piece provided with slots and secured to the socket, a plurality of springs disposed through the slots of the bridge piece and having one of their ends secured to the socket and their opposite ends secured to a movable plate, a trolley pole carried by the socket, and means carried by the standard for limiting the movement of the trolley pole beyond a predetermined point.

In testimony whereof I have signed my name to this specification.

NORMAN BEAVIS TEMPLER.